US010921887B2

(12) United States Patent
Rodriguez Bravo et al.

(10) Patent No.: US 10,921,887 B2
(45) Date of Patent: Feb. 16, 2021

(54) COGNITIVE STATE AWARE ACCELERATED ACTIVITY COMPLETION AND AMELIORATION

(71) Applicant: INTERNATIONAL BUSINESS MACHINES CORPORATION, Armonk, NY (US)

(72) Inventors: Cesar Augusto Rodriguez Bravo, Alajuela (CR); Shikhar Kwatra, Durham, NC (US); Sarbajit K. Rakshit, Kolkata (IN); Indervir Singh Banipal, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/441,087

(22) Filed: Jun. 14, 2019

(65) Prior Publication Data

US 2020/0393901 A1 Dec. 17, 2020

(51) Int. Cl.
*G06F 3/048* (2013.01)
*G06F 3/01* (2006.01)
*G06N 20/00* (2019.01)
*G06F 1/16* (2006.01)

(52) U.S. Cl.
CPC .............. *G06F 3/015* (2013.01); *G06F 1/163* (2013.01); *G06F 3/017* (2013.01); *G06N 20/00* (2019.01); *G06F 2203/011* (2013.01)

(58) Field of Classification Search
None
See application file for complete search history.

(56) References Cited

U.S. PATENT DOCUMENTS

| 6,927,770 | B2 | 8/2005 | Ording |
| 7,290,698 | B2 | 11/2007 | Poslinski et al. |
| 7,665,024 | B1 * | 2/2010 | Kondziela ............... G06F 9/451 715/745 |
| 8,621,416 | B1 * | 12/2013 | Thomas ............... G06F 9/44505 717/100 |
| 8,670,848 | B1 * | 3/2014 | Pelosi ................... G01C 22/006 700/91 |
| D711,418 | S * | 8/2014 | Xie ............................. D14/487 |

(Continued)

OTHER PUBLICATIONS

Mell et al., "The NIST Definition of Cloud Computing", NIST, Special Publication 800-145, Sep. 2011, 7 pages.

*Primary Examiner* — Hua Lu
(74) *Attorney, Agent, or Firm* — Brian Restauro; Andrew D. Wright; Roberts Calderon Safran & Cole, P.C.

(57) ABSTRACT

Methods and systems for cognitive state aware accelerated activity completion and amelioration are disclosed. A method includes: collecting data related to a cognitive state of a user and a physical state of the user; determining a type of an activity performed by the user and an amount of work for the activity; determining the cognitive state of the user and the physical state of the user based on the data related to the cognitive state of the user and the physical state of the user; determining a predicted completion time for the activity based on the type of the activity, the amount of work for the activity, the cognitive state of the user, and the physical state of the user; and displaying a progress indicator including a portion of the activity that has been completed and an estimated completion time.

16 Claims, 7 Drawing Sheets

(56) References Cited

U.S. PATENT DOCUMENTS

| | | | | |
|---|---|---|---|---|
| 8,869,115 B2 * | 10/2014 | Bruns | G06F 9/451 | 717/124 |
| 9,547,408 B2 * | 1/2017 | Bromer | H04M 1/72563 | |
| 10,187,254 B2 * | 1/2019 | Li | H04L 41/0813 | |
| 10,235,466 B2 * | 3/2019 | Brunn | G06F 16/245 | |
| 2001/0055017 A1 * | 12/2001 | Ording | G06F 3/0481 | 345/440 |
| 2003/0046401 A1 * | 3/2003 | Abbott | G06F 9/451 | 709/228 |
| 2005/0182773 A1 * | 8/2005 | Feinsmith | G06Q 10/10 | |
| 2006/0013555 A1 | 1/2006 | Poslinski | | |
| 2006/0190822 A1 * | 8/2006 | Basson | G06Q 10/10 | 715/700 |
| 2006/0277467 A1 * | 12/2006 | Reponen | G06F 3/011 | 715/708 |
| 2007/0088833 A1 * | 4/2007 | Yang | G06F 16/436 | 709/227 |
| 2008/0256473 A1 * | 10/2008 | Chakra | G06F 3/0481 | 715/772 |
| 2008/0270928 A1 * | 10/2008 | Chakra | G06F 11/3664 | 715/772 |
| 2009/0070699 A1 * | 3/2009 | Birkill | G06F 9/451 | 715/772 |
| 2009/0113334 A1 * | 4/2009 | Chakra | G06F 9/451 | 715/772 |
| 2010/0082516 A1 * | 4/2010 | Basu | G06N 5/02 | 706/47 |
| 2011/0166777 A1 * | 7/2011 | Chavakula | G06F 3/04883 | 701/533 |
| 2011/0283189 A1 * | 11/2011 | McCarty | H04N 21/4532 | 715/707 |
| 2012/0226993 A1 * | 9/2012 | Bromer | G06F 3/011 | 715/744 |
| 2012/0319869 A1 * | 12/2012 | Dorfmann | G08B 21/06 | 340/945 |
| 2013/0235044 A1 * | 9/2013 | Kaleta | G06F 3/0481 | 345/473 |
| 2013/0239039 A1 * | 9/2013 | Kaleta | G06F 3/0481 | 715/772 |
| 2013/0246962 A1 * | 9/2013 | Kaleta | G06F 3/0481 | 715/772 |
| 2014/0280296 A1 * | 9/2014 | Johnston | G06F 9/453 | 707/769 |
| 2014/0371887 A1 * | 12/2014 | Hoffman | G06K 9/00342 | 700/91 |
| 2015/0012225 A1 * | 1/2015 | Mattila | G06F 19/00 | 702/19 |
| 2015/0098691 A1 * | 4/2015 | Avrahami | H04N 5/783 | 386/241 |
| 2015/0119198 A1 * | 4/2015 | Wisbey | A61B 5/1455 | 482/9 |
| 2016/0147425 A1 * | 5/2016 | Baughman | G06F 9/451 | 715/745 |
| 2016/0321935 A1 * | 11/2016 | Mohler | G09B 5/08 | |
| 2016/0349937 A1 * | 12/2016 | Harrison | G06F 40/134 | |
| 2016/0358491 A1 * | 12/2016 | Young | G06F 21/32 | |
| 2017/0004459 A1 * | 1/2017 | Karsten | A61B 5/7475 | |
| 2017/0031559 A1 * | 2/2017 | Lee | G06F 3/012 | |
| 2017/0041272 A1 * | 2/2017 | Chang | G06F 3/0488 | |
| 2017/0124531 A1 * | 5/2017 | McCormack | G06F 3/04845 | |
| 2017/0153779 A1 * | 6/2017 | Seacat DeLuca | G06F 3/0484 | |
| 2017/0168703 A1 * | 6/2017 | Feris | G06F 3/011 | |
| 2017/0200133 A1 * | 7/2017 | Werner | G06Q 10/0633 | |
| 2017/0208021 A1 * | 7/2017 | Ingram | G06Q 10/109 | |
| 2017/0289619 A1 * | 10/2017 | Xu | H04N 21/251 | |
| 2017/0316707 A1 * | 11/2017 | Lawrenson | A61B 5/7475 | |
| 2017/0354846 A1 * | 12/2017 | Von Rueckmann | G09B 19/0038 | |
| 2018/0130373 A1 * | 5/2018 | Bernard-Paroly | G06F 3/017 | |
| 2018/0150783 A1 * | 5/2018 | Xu | G06N 20/00 | |
| 2018/0240027 A1 * | 8/2018 | Karanam | G16H 50/20 | |
| 2018/0325441 A1 | 11/2018 | Deluca et al. | | |
| 2018/0336509 A1 * | 11/2018 | Guttmann | G06F 16/2379 | |
| 2019/0014378 A1 * | 1/2019 | Shah | H04N 21/44218 | |
| 2019/0015751 A1 * | 1/2019 | Kahn, II | A61B 5/168 | |
| 2019/0227626 A1 * | 7/2019 | Mohammadrezazadeh | A61B 5/18 | |
| 2019/0334907 A1 * | 10/2019 | Rodden | G06Q 10/063116 | |
| 2020/0050861 A1 * | 2/2020 | Wexler | G06K 9/209 | |
| 2020/0054931 A1 * | 2/2020 | Martin | G06F 3/0334 | |

* cited by examiner

COGNITIVE STATE AWARE ACCELERATED ACTIVITY COMPLETION AND AMELIORATION

BACKGROUND

The present invention generally relates to computing devices and, more particularly, to methods and systems for cognitive state aware accelerated activity completion and amelioration.

Computing devices are used by students to perform various educational activities such as taking a practice test, reading a required assigned reading/textbook, and solving math problems. IBM® Watson Education® (IBM and Watson Education are registered trademarks of International Business Machines Corporation in the United States and/or other countries), is focused on using artificial intelligence (AI) to improve learning outcomes and implement solutions that will help all students succeed. Watson Education relies on digital trends and AI technology to give teachers the tools they need to be most effective and help learners perform at the top of their abilities. By using AI as an added assistant in the classroom, lifelong learning is encouraged and each person is met with the individualized tools they need to succeed in school and beyond.

SUMMARY

In a first aspect of the invention, there is a method that includes: collecting, by a computing device, data related to a cognitive state of a user and a physical state of the user; determining, by the computing device, a type of an activity performed by the user and an amount of work for the activity; determining, by the computing device, the cognitive state of the user and the physical state of the user based on the data related to the cognitive state of the user and the physical state of the user; determining, by the computing device, a predicted completion time for the activity based on the type of the activity, the amount of work for the activity, the cognitive state of the user, and the physical state of the user; and displaying, by the computing device, a progress indicator including a portion of the activity that has been completed and an estimated completion time.

In another aspect of the invention, there is a computer program product that includes a computer readable storage medium having program instructions embodied therewith. The program instructions are executable by a computing device to cause the computing device to: collect data related to a cognitive state of a user; determine a type of an activity performed by the user and an amount of work for the activity; determine a cognitive state of the user based on the data related to the cognitive state of the user; determine a predicted completion time for the activity based on the type of the activity, the amount of work for the activity, and the cognitive state of the user; and display a progress indicator including a portion of the activity that has been completed and an estimated completion time.

In another aspect of the invention, there is a system that includes: a hardware processor, a computer readable memory, and a computer readable storage medium associated with a computing device; program instructions to collect data related to a cognitive state of a user and a physical state of the user; program instructions to determine a type of an activity performed by the user and an amount of work for the activity; program instructions to determine the cognitive state of the user and the physical state of the user based on the data related to the cognitive state of the user and the physical state of the user; program instructions to determine a predicted completion time for the activity based on the type of the activity, the amount of work for the activity, the cognitive state of the user, and the physical state of the user; and program instructions to display a progress indicator including a portion of the activity that has been completed and an estimated completion time, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for cognitive state aware accelerated activity completion and amelioration. As described herein, aspects of the invention include a method and system for dynamically tracking a user's current progress with respect to an activity and the user's cognitive state and generating and displaying a predicted activity completion timeline based on the tracked information. Aspects of the invention also include a method and system for using the tracked information about the user's cognitive state to recommend performance-boosting steps that may accelerate completion of the activity.

The performance of any activity (e.g., taking a practice test, reading a required assigned reading/textbook, solving math problems, etc.) depends on a cognitive state of a user (e.g., a student). If, for example, the user is drowsy, sad, tense, angry, etc., then the user's performance may be reduced, and a quality level associated with the user's completion of the activity may be reduced. On the other hand, if the user is confident, steady, etc., then the user's performance may be improved, and the quality level associated with the user's completion of the activity may be higher. Additionally, the time required for the user to complete an activity may vary depending on the user's cognitive state. Accordingly, the user's cognitive state is typically a significant variable affecting the user's performance of the activity.

Embodiments address problems that can affect a user's performance of an activity. Accordingly, embodiments improve the functioning of a computer by providing methods and systems for cognitive state aware accelerated activity completion and amelioration. In particular, embodiments improve software by providing a method and system for dynamically tracking a user's current progress with respect to an activity and the user's cognitive state and generating and displaying a predicted activity completion timeline based on the tracked information. Embodiments also improve software by providing a method and system for using the tracked information about the user's cognitive state to recommend performance-boosting steps (e.g., a study break) that may accelerate completion of the activity. Additionally, implementations of the invention use techniques that are, by definition, rooted in computer technology (e.g., artificial intelligence, machine learning, deep learning, neural networks, and cloud computing).

To the extent the implementations collect, store, or employ personal information (e.g., cognitive state, physical state, biometric data, etc.) of individuals, it should be understood that such information shall be used in accordance with all applicable laws concerning protection of personal information. Additionally, the collection, storage, and use of such information, as well as, e.g., use of the cognitive state aware accelerated activity completion and amelioration methods and systems described herein, may be subject to advance notification and consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
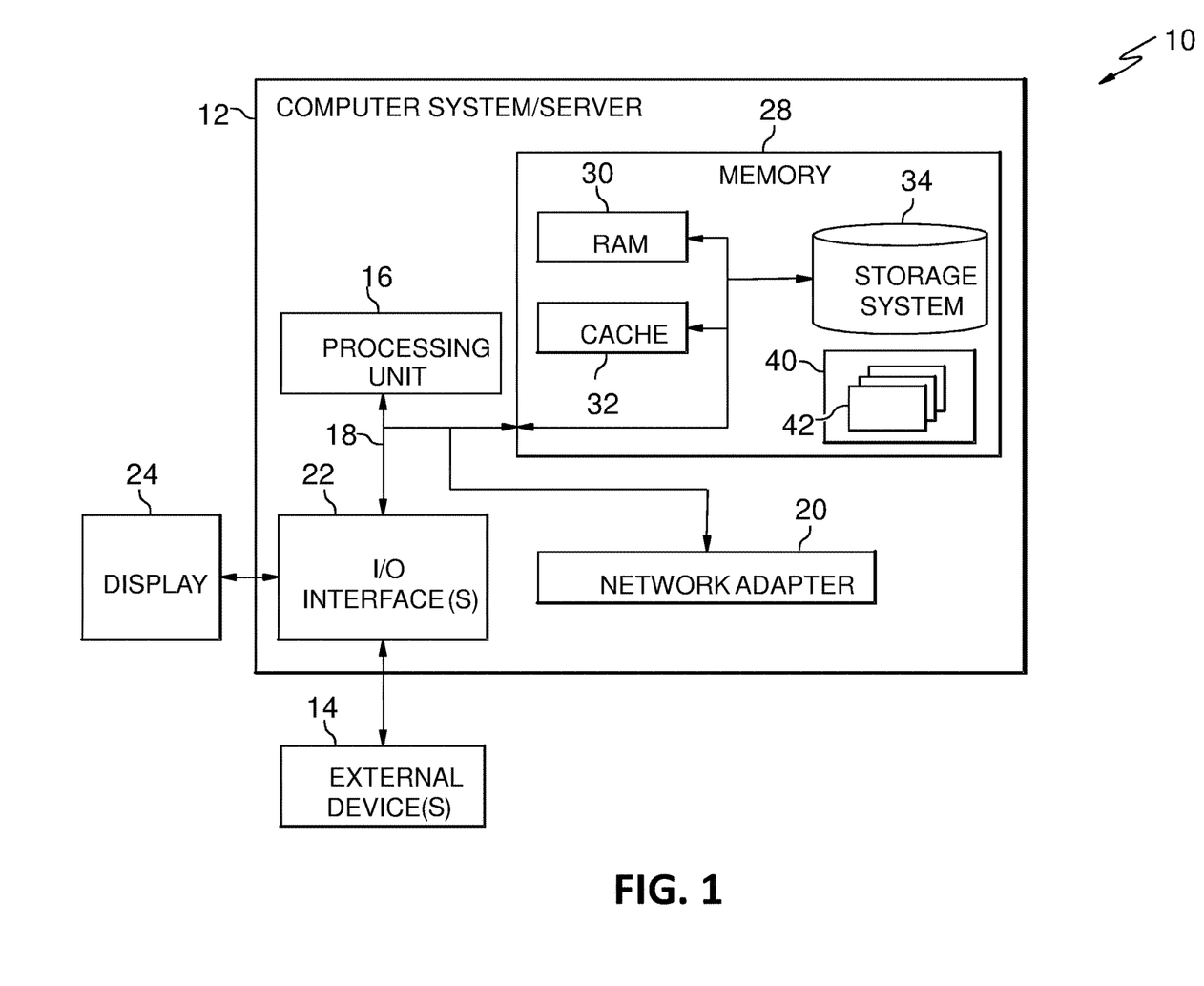
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
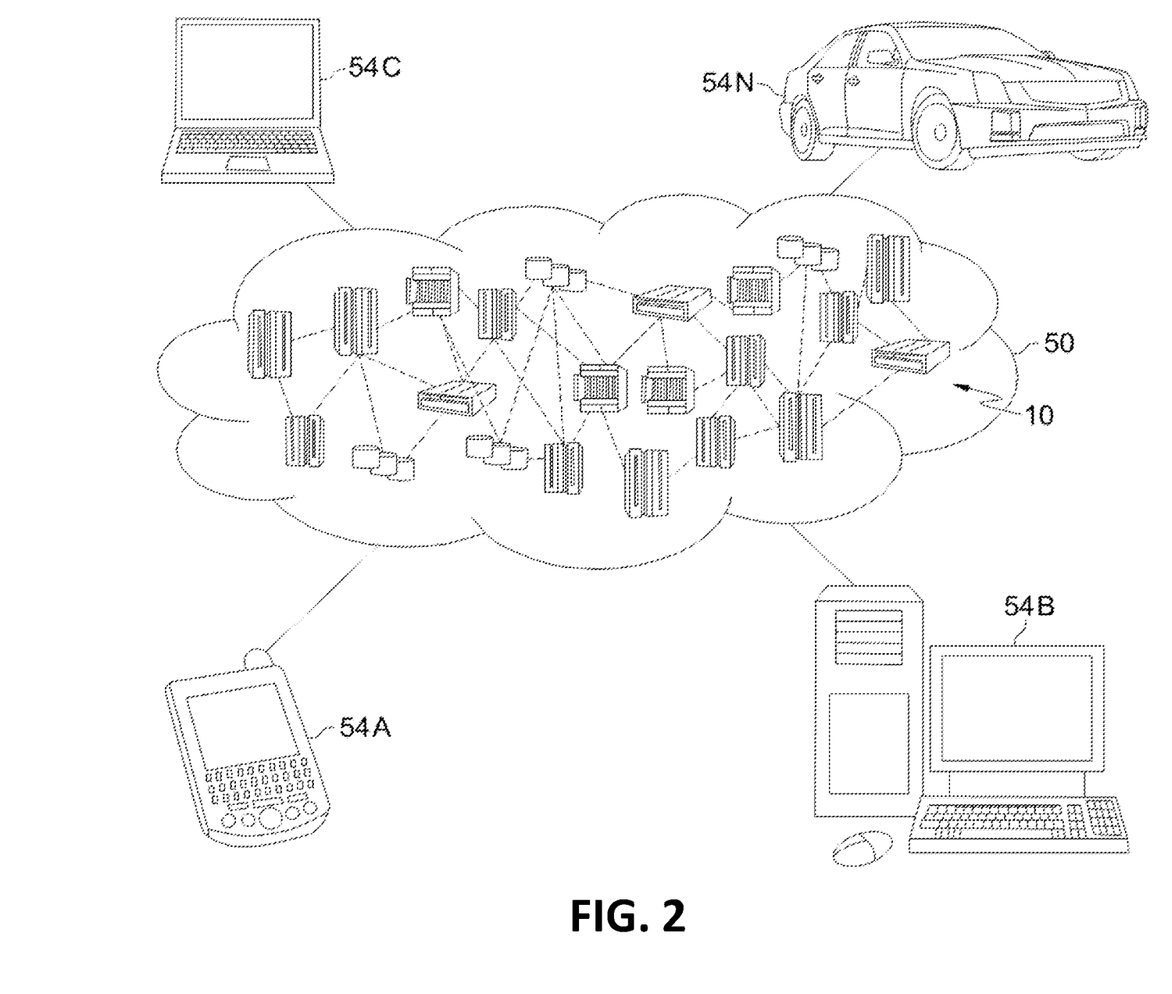
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
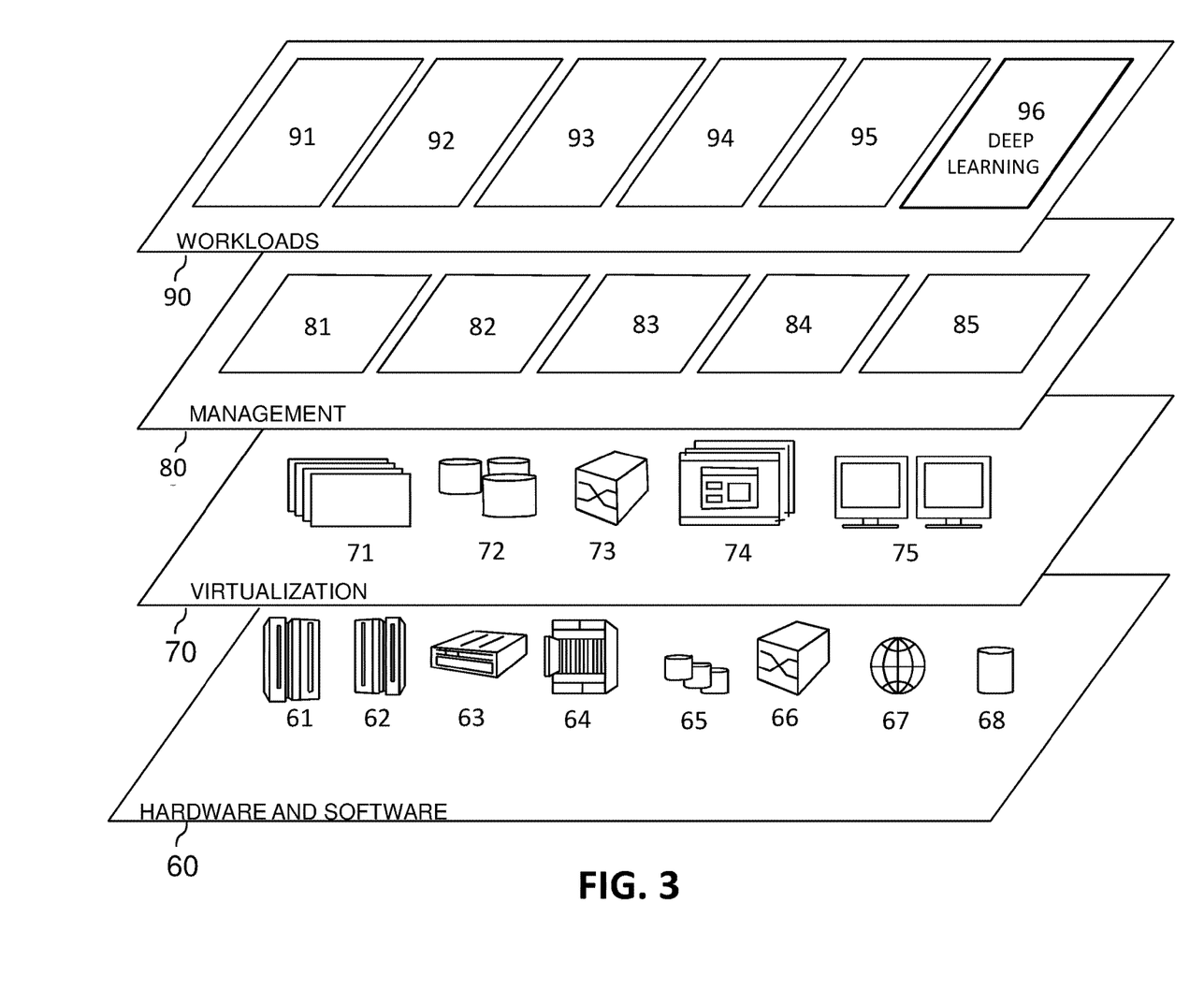
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deep learning 96.

Referring back to FIG. 1, the program/utility 40 may include one or more program modules 42 that generally carry out the functions and/or methodologies of embodiments of the invention as described herein (e.g., such as the functionality provided by deep learning 96). Specifically, the program modules 42 may dynamically track a user's current progress with respect to an activity and the user's cognitive state and generate and display a predicted activity completion timeline based on the tracked information. Additionally, the program modules 42 may use the tracked information about the user's cognitive state to recommend performance-boosting steps that may accelerate completion of the activity. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a deep learning program module 410 and an activity acceleration program module 425 as shown in FIG. 4.

Figure 4:
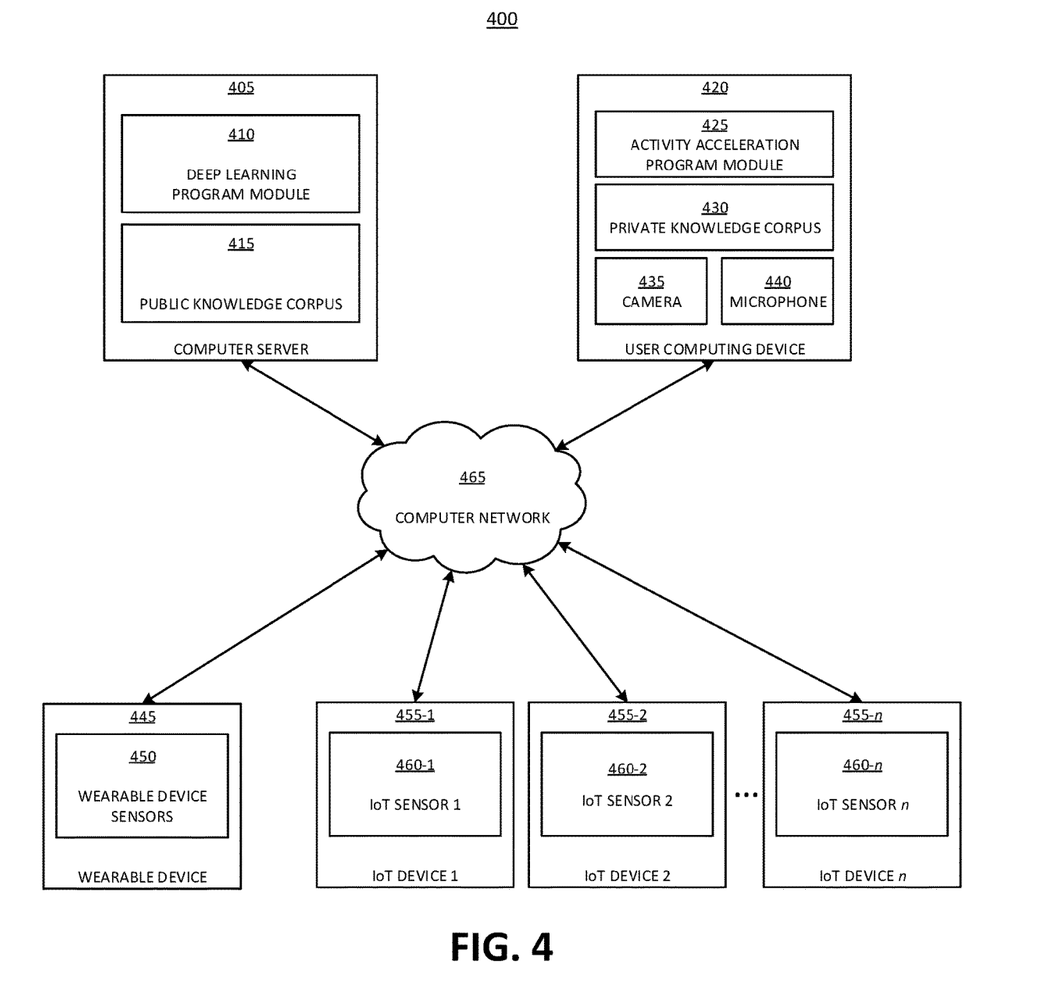
FIG. 4 depicts an illustrative environment in accordance with aspects of the invention.

FIG. 4 depicts an illustrative environment 400 in accordance with aspects of the invention. As shown, the environment 400 comprises a computer server 405, a user computing device 420, a wearable device 445, and a plurality of Internet of Things (IoT) devices 455-1, 455-2, . . . , 455-n which are in communication via a computer network 465. In embodiments, the computer network 465 is any suitable network including any combination of a LAN, WAN, or the Internet. In embodiments, the computer server 405, the user computing device 420, the wearable device 445, and the plurality of IoT devices 455-1, 455-2, . . . , 455-n are physically collocated, or, more typically, are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the computer server 405 is a cloud computing node 10 (as shown in FIG. 1). In embodiments, the computer server 405 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the computer server 405 includes deep learning program module 410 which, in coordination with activity acceleration program module 425 of the user computing device 420, provides for dynamically tracking a user's current progress with respect to an activity and the user's cognitive state, generating and displaying a predicted activity completion timeline based on the tracked information, and using the tracked information about the user's cognitive state to recommend performance-boosting steps that may accelerate completion of the activity, as described below. In embodiments, the program instructions included in the deep learning program module 410 of the computer server 405 are executed by one or more hardware processors. In embodiments, the computer server 405 also includes public knowledge corpus 415, which stores information from a plurality of users correlating cognitive states of users, performance of activities, and time to complete activities, as described below.

Still referring to FIG. 4, in embodiments, the user computing device 420 is a computer device comprising one or more elements of the computer system/server 12 (as shown in FIG. 1). In particular, the user computing device 420 is a desktop computer, a laptop computer, a mobile device such as a cellular phone, tablet, personal digital assistant (PDA), or other computing device.

In embodiments, the user computing device 420 includes the activity acceleration program module 425 which, in coordination with the deep learning program module 410 of the computer server 405, provides for dynamically tracking a user's current progress with respect to an activity and the user's cognitive state, generating and displaying a predicted activity completion timeline based on the tracked information, and using the tracked information about the user's cognitive state to recommend performance-boosting steps that may accelerate completion of the activity, as described below. In embodiments, the program instructions included in the activity acceleration program module 425 of the user computing device 420 are executed by one or more hardware processors. In embodiments, the user computing device 420 also includes private knowledge corpus 430, which stores information from a user of the user computing device 420 correlating cognitive states of the user, performance of activities, and time to complete activities, as described below.

In embodiments, the user computing device 420 also includes a camera 435, which is a digital still camera or a digital video camera. The camera 435 may be a charge-coupled device (CCD) sensor or a complementary metal-oxide-semiconductor (CMOS) sensor. Additionally, in embodiments, the user computing device 420 includes a microphone 440.

Still referring to FIG. 4, in embodiments, the wearable device 445 is any type of computer-based activity tracker, fitness tracker, smart watch, sleep tracker, biosensor device, or other device that is typically worn by a user and that tracks information related to activity, fitness, location, and/or health. In embodiments, the wearable device 445 includes one or more elements of the computer system/server 12 (as shown in FIG. 1). The wearable device 445 includes wearable device sensors 450 that collect biometric data (e.g., heart rate) and/or data that is usable to determine or estimate activities and/or a location of the wearer.

Still referring to FIG. 4, in embodiments, each of the plurality of IoT devices 455-1, 455-2, . . . , 455-n is any type of computer-based device (e.g., a smart home device) that includes at least one IoT sensor 460-1, 460-2, 460-n such as digital video cameras, digital still cameras, microphones, temperature sensors, motion sensors, location sensors, and any other type of digital sensor that collects data in a user's home, workplace, or any other location where the user computing device 420 is present. In embodiments, each of the plurality of IoT devices 455-1, 455-2, . . . , 455-n includes one or more elements of the computer system/server 12 (as shown in FIG. 1).

Figure 5:
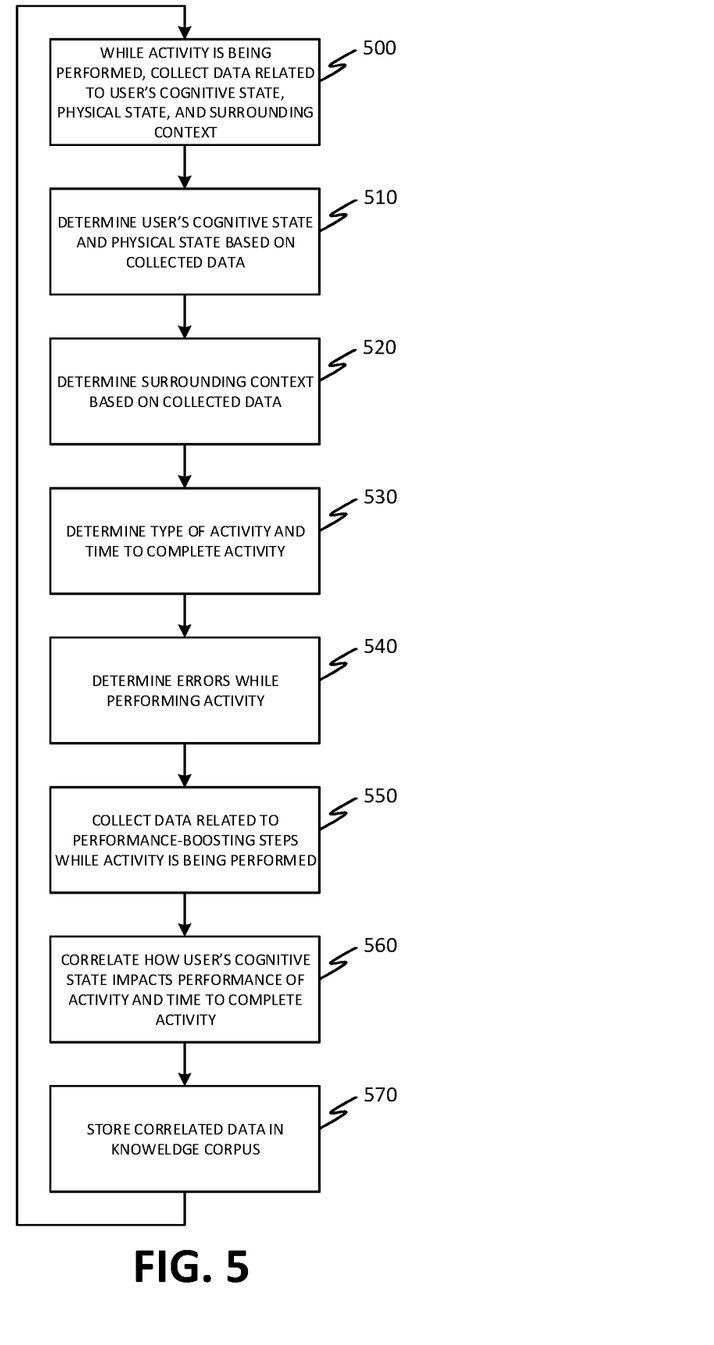
FIGS. 5 and 6 depict flowcharts of exemplary methods performed in accordance with aspects of the invention.

FIG. 5 depicts a flowchart of an exemplary training method for building a knowledge corpus (used by the method of FIG. 6, described below). The method of FIG. 5 is performed by the deep learning program module 410 of the computer server 405 and the activity acceleration program module 425 of the user computing device 420 in accordance with aspects of the invention. The steps of the method are performed in the environment of FIG. 4 and are described with reference to the elements shown in FIG. 4.

At step 500, while an activity is being performed, the user computing device 420 collects data related to a user's cognitive state, physical state, and surrounding context. In embodiments, the activity acceleration program module 425 collects data while the user is performing various activities (e.g., taking a practice test, reading a required assigned reading/textbook, solving math problems, a job-related task, etc.) using the user computing device 420. In embodiments, the user computing device 420 continuously collects the data related to the user's cognitive state (e.g., focused, confident, distracted, etc.), physical state (e.g., alert, sleepy, etc.), and surrounding context (e.g., environmental factors such as illumination level, noise level, weather, location, and presence of other people) while the user is performing activities using the user computer device 420. In other embodiments, the user computing device 420 collects the data related to the user's cognitive state, physical state, and surrounding context at predetermined intervals (e.g., every five minutes). The collected data includes data that is usable by the activity acceleration program module 425 of the user computing device 420 (either by itself or in conjunction with the deep learning program module 410 of the computer server 405) to determine the user's cognitive state, physical state, and surrounding context. In particular, in embodiments, the collected data includes digital images or digital video acquired by the camera 435, audio acquired by the microphone 440, biometric data acquired by the wearable device sensors 450, and/or sensor data acquired by the IoT sensors 460-1, 460-2, . . . , 460-n.

Still referring to FIG. 5, at step 510, the user computing device 420 determines the user's cognitive state and physical state based on the collected data. In embodiments, the activity acceleration program module 425 (either by itself or in conjunction with the deep learning program module 410 of the computer server 405) analyzes the data collected at step 500 to determine the user's cognitive state and physical state while the user is performing various activities using the user computing device 420. In particular, in embodiments, the activity acceleration program module 425 (either by itself or in conjunction with the deep learning program module 410 of the computer server 405) analyzes the digital images or digital video acquired by the camera 435, the audio acquired by the microphone 440, the biometric data acquired by the wearable device sensors 450, and/or the sensor data acquired by the IoT sensors 460-1, 460-2, . . . , 460-n to identify the user's cognitive state and physical state.

In an example, the activity acceleration program module 425 and/or the deep learning program module 410 of the computer server 405 use a region convolutional neural network (RCNN) to perform image classification and/or object detection using the digital images or digital video acquired by the camera 435. In particular, the RCNN is used to identify facial expressions (e.g., yawns) and body language (e.g., upright posture or slouching posture) and determine the user's cognitive state and physical state based on the identified facial expressions and body language as well as the biometric data acquired by the wearable device sensors 450.

Still referring to FIG. 5, at step 520, the user computing device 420 determines the surrounding context based on the collected data. In embodiments, the activity acceleration program module 425 (either by itself or in conjunction with the deep learning program module 410 of the computer server 405) analyzes the data collected at step 500 to determine the surrounding context while the user is performing various activities using the user computing device 420. In particular, in embodiments, the activity acceleration program module 425 (either by itself or in conjunction with the deep learning program module 410 of the computer server 405) analyzes the digital images or digital video acquired by the camera 435, the audio acquired by the microphone 440, and/or the sensor data acquired by the IoT sensors 460-1, 460-2, . . . , 460-n to identify the surrounding context.

Still referring to FIG. 5, at step 530, the user computing device 420 determines the type of activity and time to complete the activity. In embodiments, the activity acceleration program module 425 (either by itself or in conjunction with the deep learning program module 410 of the computer server 405) analyzes the data collected at step 500 to determine the type of activity the user is performing using the user computing device 420 as well as the time required to complete the activity. In embodiments, the activity acceleration program module 425 tracks a total amount of time a user engages in the activity, from start to finish. Optionally, the activity acceleration program module 425 also tracks time to complete various portions of the activity (e.g., time spent reading each page in a textbook).

Still referring to FIG. 5, at step 540, the user computing device 420 determines errors while performing the activity. In embodiments, the activity acceleration program module 425 determines a number of errors that the user makes while performing the activity and/or a number of times a user repeats portions of the activity. In an example, while a user is taking a practice test or solving math problems, the activity acceleration program module 425 determines a number of incorrect answers provided by the user. In another example, while a user is reading a required assigned reading/textbook, the activity acceleration program module 425 determines a number of times that a user pauses for an unusually long time on a page of the assigned reading/textbook, takes longer than usual to read the page, and/or rereads the page.

Still referring to FIG. 5, at step 550, the user computing device 420 collects data related to performance-boosting steps while an activity is being performed. In embodiments, the activity acceleration program module 425 collects the data related to performance-boosting steps taken by a user while the user is performing an activity. In an example, while a user is solving math problems, the activity acceleration program module 425 determines actions that the user is taking to boost performance (e.g., during study breaks), such as taking a nap, having a coffee, or playing a word game on the user computing device 420.

Still referring to FIG. 5, at step 560, the computer server 405 and the user computing device 420 correlate how the user's cognitive state impacts performance of an activity and time to complete the activity. In embodiments, the activity acceleration program module 425 of the user computing device 420, in conjunction with the deep learning program module 410 of the computer server 405, correlates how the user's cognitive state impacts performance of an activity and time to complete the activity. In embodiments, the activity acceleration program module 425 transmits, to the deep learning program module 410 on the computer server 405, information about the cognitive state determined at step 510, the surrounding context determined at step 520, the type of activity and time to complete the activity determined at step 530, the errors determined at step 540, and the data related to performance-boosting steps collected at step 550, and this data is correlated by the deep learning program module 410. In embodiments, this correlation at step 560 is performed by the deep learning program module 410 using deep learning techniques including an artificial neural network (ANN).

Still referring to FIG. 5, at step 570, the computer server 405 stores the correlated data in a knowledge corpus. In embodiments, the deep learning program module 410 stores the data correlated at step 560 in the private knowledge corpus 430 on the user computing device 420. Additionally, the correlated data is added to the public knowledge corpus 415 on the computer server 405. Next, the flow returns to step 500, and the training continues so that the public knowledge corpus 415 and the private knowledge corpus 430 are further developed.

Figure 6:
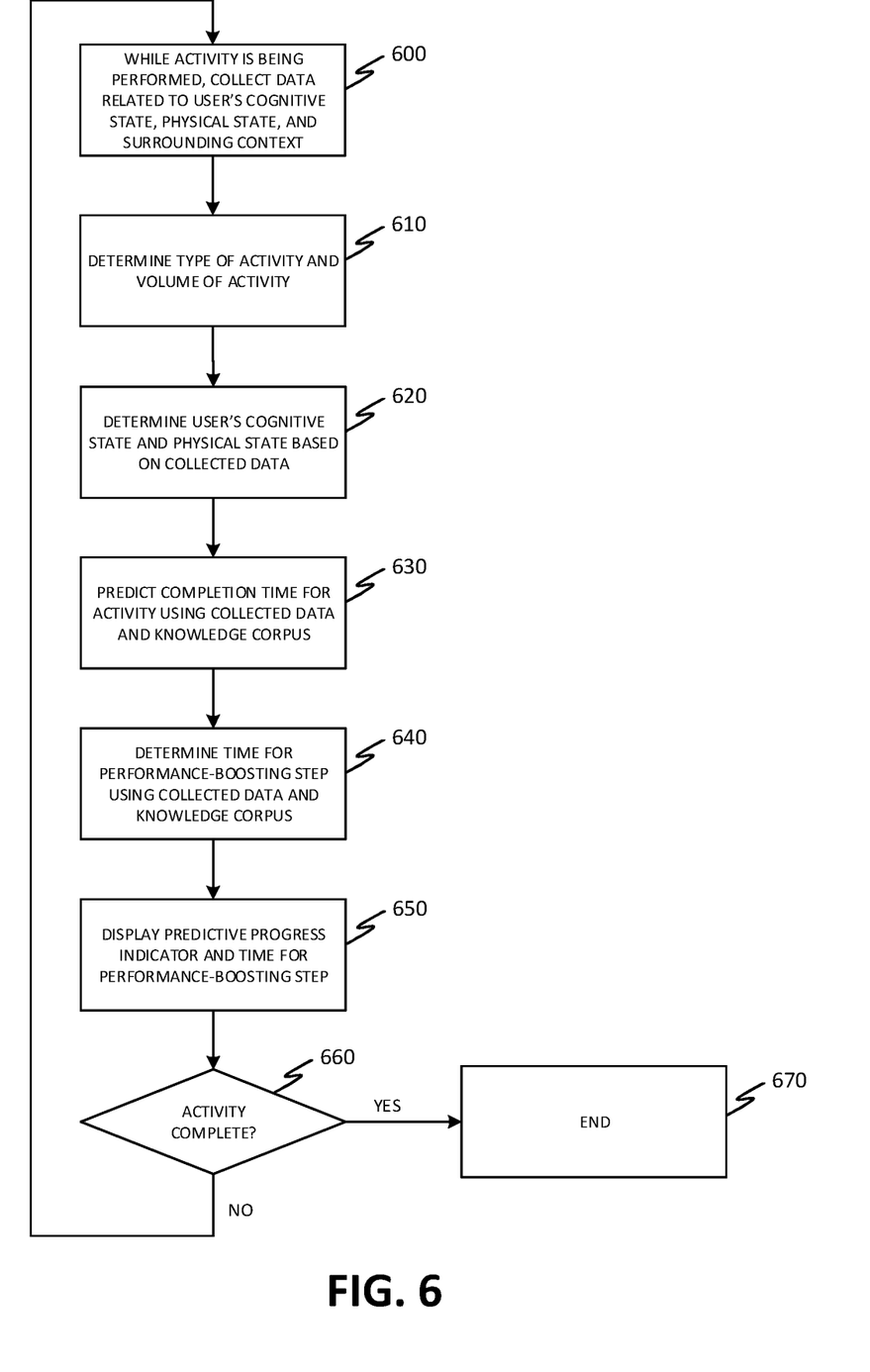

FIG. 6 depicts a flowchart of an exemplary method for dynamically tracking a user's current progress with respect to an activity, displaying a predicted activity completion timeline, and recommending performance-boosting steps that may accelerate completion of the activity. The method of FIG. 6 uses the public knowledge corpus 415 and the private knowledge corpus 430 generated according to the method of FIG. 5. In embodiments, the method of FIG. 6 is performed by the deep learning program module 410 of the computer server 405 and the activity acceleration program module 425 of the user computing device 420 in accordance with aspects of the invention. The steps of the method are performed in the environment of FIG. 4 and are described with reference to the elements shown in FIG. 4.

Referring to FIG. 6, at step 600, while an activity is being performed, the user computing device 420 collects data related to a user's cognitive state, physical state, and surrounding context. In embodiments, the activity acceleration program module 425 collects data while the user is performing an activity (e.g., taking a practice test, reading a required assigned reading/textbook, solving math problems, a job-related task, etc.) using the user computing device 420. In embodiments, the user computing device 420 continuously collects the data related to the user's cognitive state (e.g., focused, confident, distracted, etc.), physical state (e.g., alert, sleepy, etc.), and surrounding context (e.g., environmental factors such as illumination level, noise level, weather, location, and presence of other people) while the user is performing activities using the user computer device 420. In other embodiments, the user computing device 420 collects the data related to the user's cognitive state, physical state, and surrounding context at predetermined intervals (e.g., every five minutes). The collected data includes data that is usable by the activity acceleration program module 425 of the user computing device 420 (either by itself or in conjunction with the deep learning program module 410 of the computer server 405) to determine the user's cognitive state, physical state, and surrounding context. In particular, in embodiments, the collected data includes digital images or digital video (e.g., of the user) acquired by the camera 435, audio acquired by the microphone 440, biometric data (of the user) acquired by the wearable device sensors 450, and/or sensor data acquired by the IoT sensors 460-1, 460-2, . . . , 460-n.

Still referring to FIG. 6, at step 610, the user computing device 420 determines the type of activity and the volume of the activity. In embodiments, the activity acceleration program module 425 determines the type of the activity (e.g., taking a practice test, reading a required assigned reading/textbook, or solving math problems) and the amount of work in the activity (e.g., a number of questions in the practice test, a number of pages or words in the assigned reading/textbook, or a number of math problems).

Still referring to FIG. 6, at step 620, the user computing device 420 determines the user's cognitive state and physical state based on the collected data. In embodiments, the activity acceleration program module 425 (either by itself or in conjunction with the deep learning program module 410 of the computer server 405) analyzes the data collected at step 600 to determine the user's cognitive state and physical state while the user is performing various activities using the user computing device 420. In particular, in embodiments, the activity acceleration program module 425 (either by itself or in conjunction with the deep learning program module 410 of the computer server 405) analyzes the digital images or digital video acquired by the camera 435, the audio acquired by the microphone 440, the biometric data acquired by the wearable device sensors 450, and/or the sensor data acquired by the IoT sensors 460-1, 460-2, . . . , 460-n to identify the user's cognitive state and physical state.

In an example, the activity acceleration program module 425 and/or the deep learning program module 410 of the computer server 405 use an RCNN to perform image classification and/or object detection using the digital images or digital video acquired by the camera 435. In particular, the RCNN is used to identify facial expressions (e.g., yawns) and body language (e.g., upright posture or slouching posture) and determine the user's cognitive state and physical state based on the identified facial expressions and body language as well as the biometric data acquired by the wearable device sensors 450.

Still referring to FIG. 6, at step 630, the user computing device 420 predicts a completion time for the activity using the collected data and the knowledge corpus. In embodiments, the activity acceleration program module 425 (either by itself or in conjunction with the deep learning program module 410 of the computer server 405) uses the data collected at step 600, the type of activity and volume of activity determined at step 610, the user's cognitive state determined at step 620, the public knowledge corpus 415, and the private knowledge corpus 430 to predict the completion time for the activity.

Still referring to FIG. 6, at step 640, the user computing device 420 determines a time for a performance-boosting step using the collected data and the knowledge corpus. In embodiments, the activity acceleration program module 425 (either by itself or in conjunction with the deep learning program module 410 of the computer server 405) uses the data collected at step 600, the type of activity and volume of activity determined at step 610, the user's cognitive state determined at step 620, the public knowledge corpus 415, and the private knowledge corpus 430 to determine the time for the performance-boosting step. In particular, the deep learning program module 410 using deep learning techniques including an ANN to determine a time for a performance-boosting step (a study break) as well as recommended study break activity (e.g., a word game). In embodiments, the deep learning program module 410 determines the time based on an actual or predicted decline in the user's performance with respect to the activity, such as an increase in a number of errors.

Still referring to FIG. 6, at step 650, the user computing device 420 displays a predictive progress indicator and a time for a performance-boosting step. In embodiments, the activity acceleration program module 425 displays the predictive progress indicator and the time for the performance-boosting step within a graphical user interface displayed by the user computing device 420. In embodiments, the predictive progress indicator is a progress bar that shows a portion (e.g., percentage) of the activity that has been completed as well as an estimated completion time (e.g., a number of hours and minutes remaining or a time of day) based on the activity volume determined at step 610 and the predicted completion time from step 630.

Still referring to step 650, the acceleration program module 425 also causes a recommended performance-boosting step to be displayed at the time determined at step 640. In embodiments, the activity acceleration program module 425 causes the recommended performance-boosting step to be displayed in or adjacent to the predictive progress indicator on the graphical user interface. In other embodiments, the activity acceleration program module 425 causes the user computing device 420 to display, in a graphical user interface, a pop-up message or any other type of message recommending the performance-boosting step to the user. In embodiments, if the acceleration program module 425 does not identify an appropriate performance-boosting step based on the type of activity determined at step 610 and the current cognitive state determined at step 620, the acceleration program module 425 may display a recommendation to perform the activity at an alternate time.

Still referring to step 650, in yet other embodiments, at the time determined at step 640, the activity acceleration program module 425 causes the user computing device 420 to automatically launch an application (e.g., a word game) or prompts the user to launch an application associated with the recommended performance-boosting step. In embodiments, the activity acceleration program module 425 prompts the user to perform an activity (e.g., play the word game) as the performance-boosting step. The activity acceleration program module 425 may also suspend or close the application associated with the performance-boosting step after a predetermined time has elapsed or a predetermined number of actions have been taken (e.g., a predetermined number of game moves have been played) and switch back to an application that had been opened at the time the user was prompted to take the performance-boosting step.

Still referring to FIG. 6, at step 660, the user computing device 420 determines whether or not the activity is complete. In embodiments, the activity acceleration program module 425 determines whether or not the user has completed the activity. If the activity acceleration program module 425 determines that the user has completed the activity, then the flow proceeds to step 670, and the method ends. On the other hand, if the activity acceleration program module 425 determines that the user has not completed the activity, then the flow returns to step 600, and the method continues.

Figure 7:
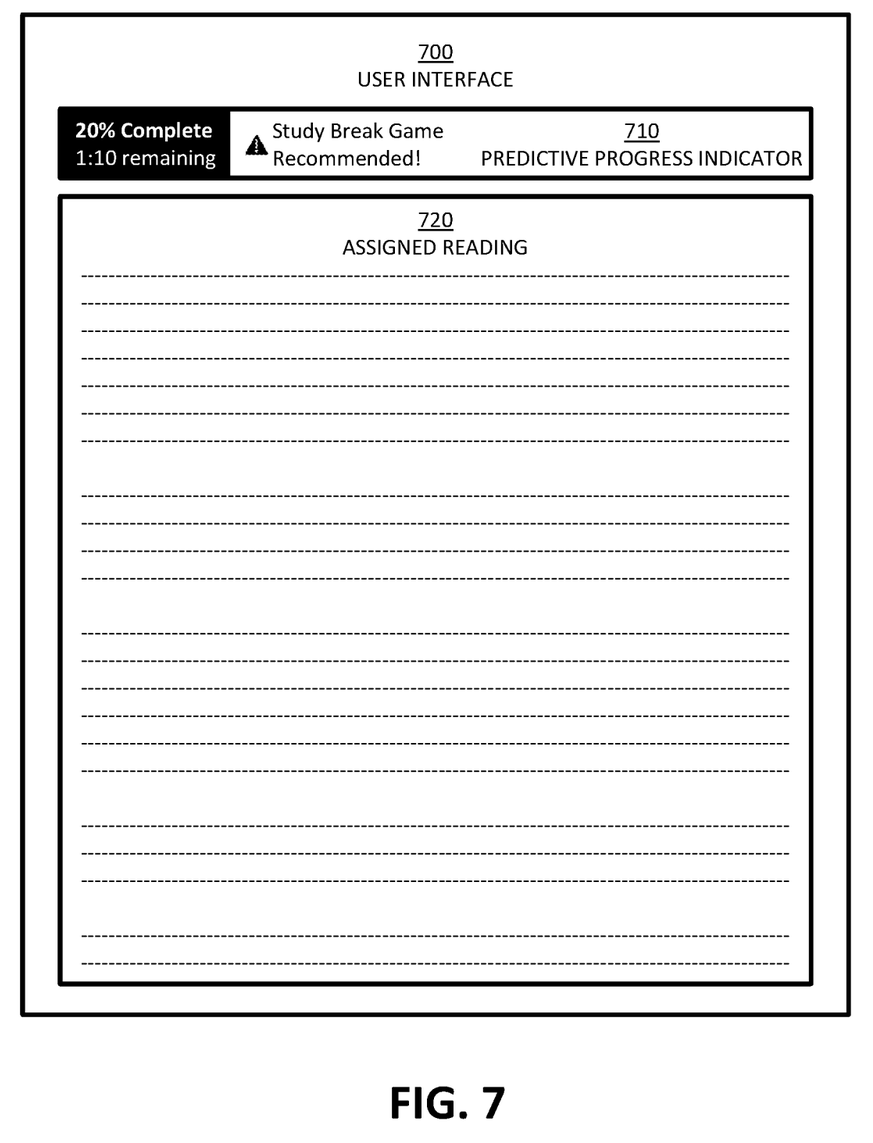
FIG. 7 depicts an illustrative example of a user interface including a predictive progress indicator displayed on a display of a user computing device in accordance with aspects of the invention.

FIG. 7 depicts an illustrative example of a user interface 700 that is displayed on a display of the user computing device 420 in accordance with aspects of the invention. The user interface 700 includes a predictive progress indicator 710 and an assigned reading 720. In embodiments, as described above with respect to step 650 of FIG. 6, the activity acceleration program module 425 displays, in the user interface 700, the predictive progress indicator 710, which includes an indication of a percentage of the assigned reading 720 that has been completed, a remaining time (in hours and minutes) until completion of the assigned reading 720, and a recommendation for a performance-boosting step.

In another embodiment, a system and method are provided for using a multitude of personalized data points and signals from: the camera 435 and the microphone 440 of the user computing device 420; and the plurality of IoT sensors 460-1, 460-2, . . . , 460-*n* of the plurality of IoT devices 455-1, 455-2, 455-*n*; etc. During installation, the activity acceleration program module 425 provides a user of the user computing device 420 an option to use a personalized model trained on personal data or a generic model trained on public data. In response to the user selecting the personalized model, the activity acceleration program module 425 trains an artificial intelligence system using the user's data according to the method described above with respect to FIG. 5., and the data correlated at step 560 (e.g., anonymized data points and signals from: the camera 435 and the microphone 440 of the user computing device 420; and the plurality of IoT sensors 460-1, 460-2, . . . , 460-*n* of the plurality of IoT devices 455-1, 455-2, 455-*n*; etc.) is stored in the public knowledge corpus 415 on the computer server 405 to enhance the generic model trained on public data. The personalized model has the advantage of combining generic data on the public cloud (i.e., the public knowledge corpus 415 on the computer server 405) with personalized data collected by the activity acceleration program module 425 on the user computer device 420, which allows for improved accuracy.

On the other hand, in response to the user selecting the generic model during installation of the activity acceleration program module 425, then the activity acceleration program module 425 avoids storing any personalized data (e.g., data points and signals from: the camera 435 and the microphone 440 of the user computing device 420; and the plurality of IoT sensors 460-1, 460-2, . . . , 460-*n* of the plurality of IoT devices 455-1, 455-2, 455-*n*; etc.) in the public knowledge corpus 415 on the computer server 405. Personalized data collection may be limited. To the extent that personalized data is collected, the activity acceleration program module 425 uses such personalized data to train a local personal model in the private knowledge corpus 430 on the user computing device 420.

In another embodiment, for each user, the activity acceleration program module 425 uses the public knowledge corpus 415 of the computer server 405 and/or the private knowledge corpus 430 of the user computing device 420 to identify a most relevant feature or set of features (e.g., a particular cognitive state, physical state, and/or surrounding context, determined at step 620 of FIG. 6 using data collected at step 600) based on the user and the type of activity (determined at step 610 of FIG. 6) that, when present, indicate a fatigue inflection point. In an example, the activity acceleration program module 425 may collect data at step 600 of FIG. 6 that includes signals such as yawning. The activity acceleration program module 425 determines using the public knowledge corpus 415 of the computer server 405 and/or the private knowledge corpus 430 of the user computing device 420 that, for the particular user, yawning is a most relevant feature that indicates a fatigue inflection point after which the user's performance in the current ongoing task is likely to significantly decrease. As the activity acceleration program module 425 and the deep learning program module 410 are trained over time according to the method of FIG. 5, detection and identification of such fatigue inflection points improves. The significance of the inflection point is that it identifies the point after which the user's performance will significantly trend downward.

Additionally, in embodiments, based on the detection of a fatigue inflection point, the activity acceleration program module 425 and the deep learning program module 410 suggest an appropriate rejuvenating activity (performance-boosting step) for the user. Initially, when the fatigue inflection point occurs, the activity acceleration program module 425 recommends random rejuvenation activities. The activity acceleration program module 425 and the deep learning program module 410 then monitor post-rejuvenation activity behavior to further train the public knowledge corpus 415 of the computer server 405 and/or the private knowledge corpus 430 of the user computing device 420. The activity acceleration program module 425 and the deep learning program module 410 record the rejuvenating activity and determine which rejuvenating activity boosts the post-rejuvenation performance to the highest levels. Accordingly, after training, the activity acceleration program module 425 and the deep learning program module 410 use information about the fatigue inflection point, user, and activity type to recommend an appropriate rejuvenation activity.

In other embodiments, a system and method are provided for predicting a time when a user will complete a task based on the user's cognitive state and current workload of the user; in response to a user performing an action that advances progress of the task, updating the predicted time when the user will complete the task; and in response to a user performing an action that advances progress of the task, displaying a graphic on a display that indicates progress of the task.

In embodiments, the system and method predict a time when a user will complete a task based on the user's cognitive state and a current workload of the user and consider the following variables using a machine learning algorithm: the user's cognitive state while performing any activity, time correlated to user profile (e.g., some users may be more productive in the morning, and other users may be more productive in the evening), location (e.g., a concentration level may vary between home, office, library, and beach), weather (e.g., a user may be more relaxed/sleepier on a cold and rainy day), date (e.g., a user's concentration level may differ between weekdays, weekends, and holidays, because the user may be distracted by family, etc.), surrounding context (e.g., environmental factors such as illumination level, noise level, etc.), the user's activity performance pattern (e.g., number of errors, rework, and repetition), a time to complete the activity, a user's physical state (e.g., sleepy or sick), type of activity, how a user is spending time to boost performance (e.g., taking a nap, having a coffee, etc.), and a change in cognitive state over a period of a time span (e.g., while studying until late in the evening, performance is reduced over time). Additionally, in embodiments, the system and method generate a recommendation for a time when the user should start a task based on predicting an optimized time and factors necessary for the user to complete the task.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   collecting, by a computing device, data related to a cognitive state of a user and a physical state of the user;
   determining, by the computing device, a type of an activity currently being performed by the user and an amount of work for the activity;
   determining, by the computing device, the cognitive state of the user and the physical state of the user based on the data related to the cognitive state of the user and the physical state of the user;
   determining, by the computing device, a predicted completion time for the activity based on the type of the activity, the amount of work for the activity, the cognitive state of the user, and the physical state of the user;

displaying, by the computing device, a progress indicator including a portion of the activity that has been completed and an estimated completion time; and determining, by the computing device, a future time for suggesting a performance-boosting step to the user, wherein the performance-boosting step is an activity that is to be performed by the user, and the computer device determines the future time based on a predicted decline in the user's performance with respect to the activity.

2. The method according to claim 1, further comprising displaying, by the computing device, a recommendation for the performance-boosting step at the determined time for the performance-boosting step.

3. The method according to claim 1, further comprising launching, by the computing device, an application associated with the performance-boosting step at the determined time for the performance-boosting step.

4. The method according to claim 3, further comprising suspending, by the computing device, the application associated with the performance-boosting step after a predetermined time has elapsed.

5. The method according to claim 1, wherein the collecting of the data comprises collecting digital images or digital video of the user.

6. The method according to claim 1, further comprising displaying, by the computing device, the performance-boosting step at the future time.

7. A computer program product comprising a computer readable storage medium having program instructions embodied therewith, the program instructions executable by a computing device to cause the computing device to:

collect data related to a current cognitive state of a user;

determine a type of an activity currently being performed by the user and an amount of work for the activity;

determine a current cognitive state of the user based on the data related to the current cognitive state of the user;

determine a predicted completion time for the activity based on the type of the activity, the amount of work for the activity, and the current cognitive state of the user;

display a progress indicator including a portion of the activity that has been completed and an estimated completion time of the activity; and determine a future time for suggesting a performance-boosting step to the user, wherein the performance-boosting step is an activity that is to be performed by the user, and the future time is determined based on a predicted decline in the user's performance with respect to the activity.

8. The computer program product according to claim 7, wherein the collecting of the data comprises collecting biometric data acquired by wearable device sensors.

9. The computer program product according to claim 7, wherein the collecting of the data comprises collecting sensor data acquired by Internet of Things sensors.

10. The computer program product according to claim 7, the program instructions further being executable by the computing device to cause the computing device to display a recommendation for the performance-boosting step at the determined time for the performance-boosting step.

11. The computer program product according to claim 7, the program instructions further being executable by the computing device to cause the computing device to launch an application associated with the performance-boosting step at the determined time for the performance-boosting step.

12. The computer program product according to claim 11, the program instructions further being executable by the computing device to cause the computing device to suspend the application associated with the performance-boosting step after a predetermined time has elapsed.

13. A system comprising:

a hardware processor, a computer readable memory, and a computer readable storage medium associated with a computing device;

program instructions to collect data related to a current cognitive state of a user and a current physical state of the user;

program instructions to determine a type of an activity currently being performed by the user and an amount of work for the activity;

program instructions to determine the current cognitive state of the user and the current physical state of the user based on the data related to the current cognitive state of the user and the current physical state of the user;

program instructions to determine a predicted completion time for the activity based on the type of the activity, the amount of work for the activity, the current cognitive state of the user, and the current physical state of the user;

program instructions to display a progress indicator including a portion of the activity that has been completed and an estimated completion time of the activity; and program instructions to determine a future time for suggesting a performance-boosting step to the user, wherein the performance-boosting step is an activity that is to be performed by the user, the future time is determined based on a predicted decline in the user's performance with respect to the activity, and the program instructions are stored on the computer readable storage medium for execution by the hardware processor via the computer readable memory.

14. The system according to claim 13, further comprising program instructions to display a recommendation for the performance-boosting step at the determined time for the performance-boosting step.

15. The system according to claim 13, further comprising program instructions to launch an application associated with the performance-boosting step at the determined time for the performance-boosting step.

16. The system according to claim 15, further comprising program instructions to suspend the application associated with the performance-boosting step after a predetermined time has elapsed.

* * * * *